A. A. MARTELL.
METHOD AND APPARATUS FOR ACCURATELY ALINING BEARINGS.
APPLICATION FILED JULY 17, 1917.
1,269,832.
Patented June 18, 1918.
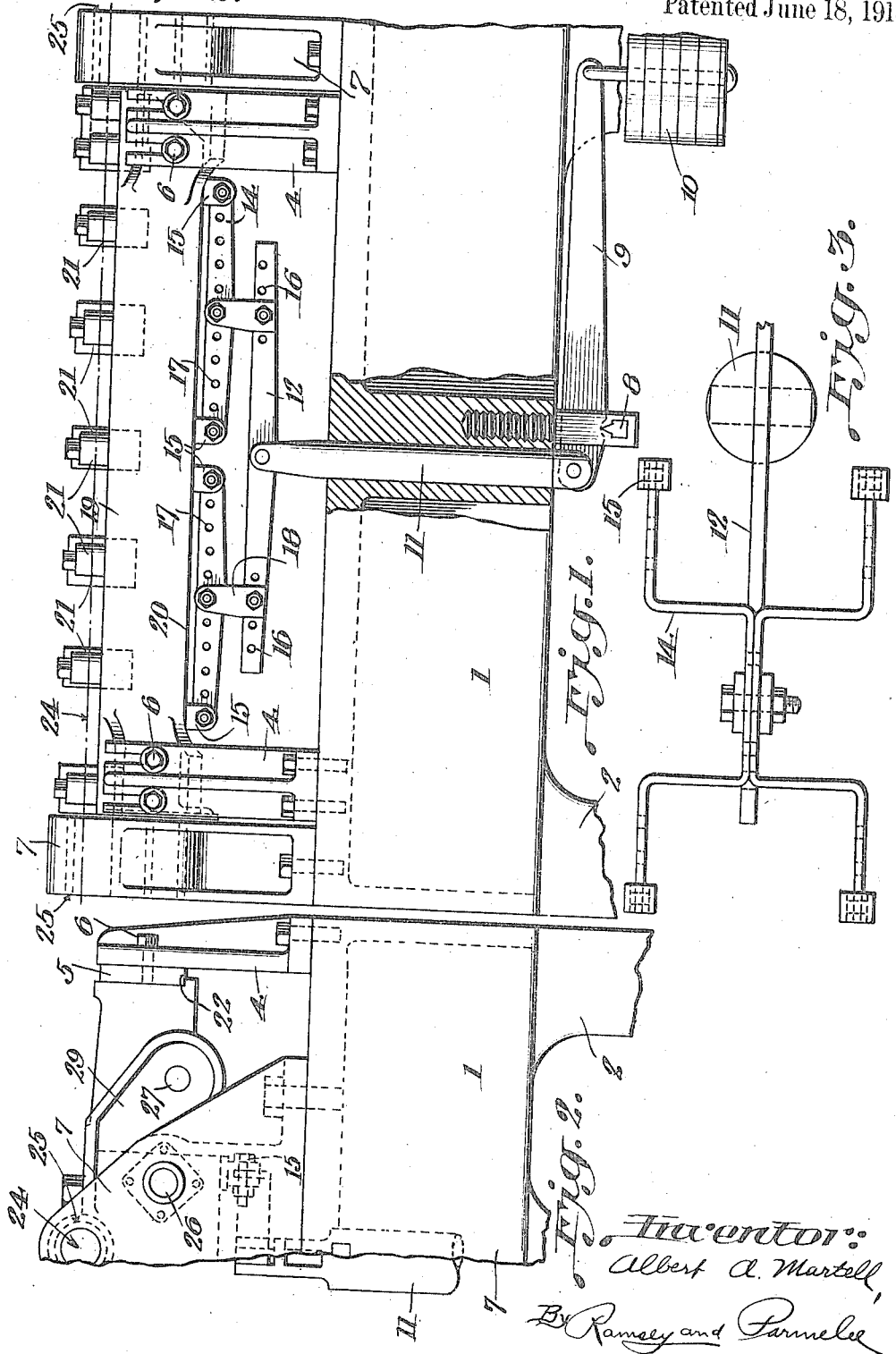
Inventor:
Albert A. Martell,
By Ramsey and Parmelee
Attys.

UNITED STATES PATENT OFFICE.

ALBERT A. MARTELL, OF WOONSOCKET, RHODE ISLAND, ASSIGNOR TO THE TAFT-PEIRCE MANUFACTURING COMPANY, OF WOONSOCKET, RHODE ISLAND, A CORPORATION OF RHODE ISLAND.

METHOD AND APPARATUS FOR ACCURATELY ALINING BEARINGS.

1,269,832.

Specification of Letters Patent.

Patented June 18, 1918.

Application filed July 17, 1917. Serial No. 181,160.

*To all whom it may concern:*

Be it known that I, ALBERT A. MARTELL, a citizen of the United States, and a resident of the city of Woonsocket, in the county of Providence, State of Rhode Island, have invented certain new and useful Improvements in Methods and Apparatus for Accurately Alining Bearings, of which the following is a specification.

This invention relates broadly to a method and apparatus for producing accurately alined bearings, and more particularly relates to the method of alining bearings, and a compensating jig or fixture.

The principal object of the present invention comprises the method of maintaining an engine bed or like member under predetermined stresses during manufacture whereby the bearings are reamed under conditions analogous to conditions of use.

An equally important and primary object of the present invention comprises a mechanism whereby the foregoing method may be carried out.

A further and equally important object of the present invention comprises the method and apparatus for stressing engine beds and the like during processes of manufacture and wherein the engine bed is supported and maintained under loads analogous to the loads supported thereby when it is assembled in an engine.

A still further and equally important object of the present invention resides in the method and apparatus for carrying out the method of loading an engine bed during manufacture thereof by producing conditions analogous to the normal load conditions of the bed when the said bed is assembled in the finished machine for which it is intended.

Another important object of the present invention comprises the method and an apparatus for maintaining an element of a machine during the manufacture thereof under load conditions analogous to those sustained by the element when the element is assembled in the machine for which it is intended.

Other and further objects of the present invention will in part be obvious and will in part be pointed out hereinafter in the specification following by reference to the accompanying drawings wherein like parts are represented by like characters throughout the several figures thereof.

Figure 1 is a more or less diagrammatic view of one form of apparatus for carrying out this invention.

Fig. 2 is an end view of the device illustrated in Fig. 1.

Fig. 3 is a detail view of one of the pressure arms.

Heretofore in the art of forming or manufacturing machine elements it has been the common practice to form the element into the desired shape without special reference to conditions of stress and where the said element in its working condition bears a normal load or weight, it is obvious that if the part be formed without reference to this normal load the linear dimensions of the part will change so that the shape manufactured does not exactly and mathematically correspond to the shape in normal working conditions. The foregoing applies particularly to the production of elements designed to carry bearings, and more especially to automobile engine beds and the like. It has heretofore been the custom in the art of manufacturing automobile engine beds to shape the bed and aline the bearings carried thereby without reference to conditions of normal load. When the engine bed is loaded with the cylinder, valve mechanism, and other parts normally carried by the bed and the bed then assembled in a chassis it will be found that the weight of the parts has caused the bed to bend and consequently the bearings carried thereby, which were originally manufactured with their axes coincident with a common mathematically straight line, are now out of alinement; with the axes of the central bearings considerably below the axes of the end bearings.

The present invention overcomes the foregoing specified difficulties by securing the machine element, or engine bed as the case may be, in a suitable jig in the same manner as it is to be secured under normal working conditions and then imposing upon the said machine element or engine bed an artificial load which produces substantially the same stresses as are produced under normal conditions when the element or machine bed is assembled in the machine for which it is intended. Then finishing and alining the machine element, or in the case of an engine bearing alining the several bearings of the bed to a predetermined mathematical line. It will be noted that when the bed is assembled in working condition the normal load will cause the bearings to assume a condition wherein the axes thereof coincide with the mathematical line to which they were originally manufactured.

More particularly the present invention comprises the securing of the engine bed or machine element at its ends in the manner in which it is intended normally to be mounted, then distributing a compensating artificial load over the bed and accurately reaming the crank shaft and other bearings while the compensating load is effective, thereby producing a part which is theoretically correct when under normal working conditions.

Referring now more particularly to the drawings, a rigid supporting bed 1 is mounted upon suitable supporting legs 2 and carries at each end work supporting brackets 4 which may be provided with filler blocks 5 that are adjustably secured to the supporting brackets 4 by means of securing bolts 6 and are provided with shoulders 22 hereinafter referred to. Adjacent the supporting brackets 4 are mounted guide bearing members 7 that are constructed to comprise supports for reaming or cutting tools as will be hereinafter explained. Adjacent the under mid portion of the supporting bed 1 there is provided a knife-edge fulcrum member 8 which is carried on a stub bolt seated in the supporting bed. A weight arm 9 is fulcrumed on the knife-edge member 8 and carries compensating weights 10 which cause the compression bar 11 to exert an upward force against a compensating horizontal bar 12 which carries on each end distributing bars 14, each of which preferably comprises four spaced apart arms that carry pressure blocks 15 adapted to distribute the force exerted through the compression bars evenly over the article being worked upon. The compensating bar 12 is provided with adjustment openings 16 and the distributing bars 14 are provided with adjustment openings 17. These openings permit the distribution of force to be largely within control of the operator by changing the length of the lever arms through adjusting the links 18 and the pressure blocks 15 relatively to their respective carrying members. As illustrated in the drawings the bed 19 of an automobile engine is shown to be the article operated upon. The bed is shown as inverted relatively to its normal position in the engine and normally the surface 20 carries the engine cylinder and upper working parts of the machine. The bed is hollow and is provided with webs that carry various crank shaft bearings 21.

In carrying out the present invention a determination is made to ascertain the distribution of weight upon the surface 20 of the bed 19 when this bed is assembled in a completed engine and positioned in the chassis ready for performing its normal function. This determination may be made in various manners, such as by carefully measuring the bending of the bed under the load, or by carefully calculating the distributed load. After this determination is made the bed is mounted as illustrated in the drawings in such manner that the right angle distance from a plane determined by the shoulders 22 of the blocks 5 to the axis 24 of the bearings 25 in the guide bearing members 7 is such that the axis of the crank shaft bearings 21 is substantially coincident with the axis 24 of the bearings 25. Then the compensating arm 12, the distributing bars 14 and their various parts, are adjusted in such manner that when suitable weights are added or subtracted from the compensating weights 10 the predetermined conditions are duplicated so far as the stresses within the engine bed are affected by the normal loading on the surface 20. In the modern conditions of standardized parts the predetermined factor specified is substantially constant for one type or style of machine or engine wherein parts are standardized to effect inter-changeability. Therefore, after predetermined conditions are once established readjustment is not required for each particular engine bed in a series of the same identity in form and shape. After the above specified compensating load is provided the bearings 21 and also the cam shaft or other bearings 26 and 27 may be reamed in accordance with the teachings of my Reissue Patent No. 14,311, issued on June 5, 1917.

It will be noted that this invention permits of the manufacture of parts with the parts when assembled and under normal load in substantially theoretically correct relation one to the other.

Realizing that my invention may be carried into effect in a manner and by constructions differing somewhat from the specific disclosure herewith I desire that it be understood the present disclosure is illustrative and not to be taken in the limiting sense, except as required by the scope of the claims.

Having thus described my invention what I claim is:

1. The method of manufacturing an engine bed and the like which comprises supporting the bed in a manner analogous to normal conditions when the bed is assembled; distributing an artificial load over the bed in such manner that the artificial load produces stresses in the bed analogous to the normal load adapted to be carried by the bed; then forming working surfaces on the engine bed while under the artificial load.

2. The method of manufacturing an engine bed and the like which comprises supporting the engine bed in a manner analogous to its normal support; determining stress conditions produced in the engine bed when the bed is assembled and supported under normal conditions; then artificially reproducing the stress conditions; and then forming work surfaces on parts attached to the engine bed and maintaining the artificial stress conditions during formation of the parts.

3. The method of manufacturing engine beds and the like with accurately alined bearings, which method comprises supporting the engine bed under conditions analogous to the normal working support thereof; determining stress conditions in said bed when in normal working position; then artificially producing stress conditions in said bed that correspond to the normal stress conditions specified; and then reaming engine bed bearings and maintaining the artificial stress conditions during the reaming operations.

4. The method of producing machine elements with accurately alined bearings, which method comprises supporting the machine element under conditions analogous to its normal working condition support; artificially producing stresses in said element which stresses correspond to the normal working stresses to which said element is subjected; then accurately forming said bearings and maintaining said machine element under said artificial stress conditions during the bearing forming operation.

5. The method of manufacturing accurately formed machine elements, which method comprises mounting said machine element under normal working conditions; imposing forces upon said machine element to set up therein stresses analogous to the normal working stresses set up in said element; then accurately forming said element and maintaining said specified stresses during the forming operation.

6. The method of manufacturing machine elements with accurately alined bearings, which comprises mounting a machine element carrying a plurality of bearings in such manner that the mount thereof corresponds to the normal assembled working mount for said element; then imposing forces upon said element to set up therein stresses analogous to the normal working stresses which said element is adapted to sustain; then forming said bearings and maintaining said forces effective during the forming operation.

7. The method of manufacturing engine beds and the like with accurately alined bearings, which method comprises, supporting the engine bed as under normal working conditions; then establishing stresses within said engine bed which stresses are analogous to the stresses which said engine bed is normally adapted to sustain; and then accurately reaming the bearings of said engine bed and maintaining said stresses during the reaming operation.

8. A device of the character described comprising in combination, a rigid bed member, supports carried by said bed member and adapted to comprise the mounts for the machine element being operated upon, means to distribute forces over a machine element mounted on said supports in such manner that said forces are analogous to the normal working load of said machine element, and devices for forming work surfaces on said machine element while said element is sustaining the forces from said means.

9. In a device of the character described, in combination, a supporting bed, supports mounted upon said bed and adapted to receive and hold a machine element, means to establish stresses in said machine element, which stresses are analogous to the stresses in said element when said element is in normal working position, and devices operable on said element while said stresses are being maintained.

10. An apparatus of the character described, comprising in combination, a rigid bed, means mounted upon said bed and adapted to comprise a work support, devices for applying forces to one side of work mounted in said support whereby stresses are set up within the said work, and mechanism for forming the work while under stress as specified.

11. A device of the character described, comprising, in combination, a rigid supporting bed, spaced apart work supports carried by said supporting bed, a fulcrum on said supporting bed, a weighted lever pivoted on said fulcrum, a compression bar connected with said lever and extending upwardly through said bed, a compensating bar mounted on the end of said compression bar, distributing means carried by said compensating bar whereby forces transmitted through said compression bar may be distributed over work secured within said work supports.

12. In a device of the character described, comprising, in combination, a rigid supporting bed, work supporting brackets carried by said supporting bed, said brackets being adapted to support an engine bed or the like, a weighted lever mounted beneath said rigid supporting bed, a compression bar connected with said lever and extending upwardly through said bed, a compensating horizontal bar mounted on said compression bar, distributing bars carried by said compensating horizontal bar, and means whereby the parts may be adjusted to distribute forces over said engine bed in accordance with predetermined requirements.

13. In a device of the character described, in combination, a rigid bed, supporting brackets adapted to hold an engine bed and the like, a fulcrum beneath said rigid bed, a weighted compensating lever pivoted on said fulcrum, a compression bar connected to said lever and extending upwardly through said bed, a compensating horizontal bar connected to said compression bar at the upper end thereof and extending horizontally between said rigid bed and the engine bed carried by said supporting brackets, distributing bars pivotally connected with said compensating bar and on each side of the middle thereof, and tool supporting members carried by said rigid bed whereby said engine bed may be operated upon while being subjected to forces distributed to the underside thereof by the distributing bars.

14. A device of the character described comprising in combination, means to support an engine bed or the like in inverted position, devices to subject said engine bed to bending forces substantially equal to the normal load tending to bend said bed when said bed is in normal working position whereby the bearings of said engine bed may be accurately alined by suitable alining devices.

15. In a device of the character described, in combination, means for supporting an engine bed or the like, devices for subjecting said engine bed or the like to stresses analogous to stresses set up in said engine bed or the like when assembled in normal relation to coöperative parts whereby the bearings of said engine bed or the like may be accurately alined by suitable alining mechanism.

ALBERT A. MARTELL.

Copies of this patent may be obtained for five cents each, by addressing the "Commissioner of Patents, Washington, D. C."